UNITED STATES PATENT OFFICE.

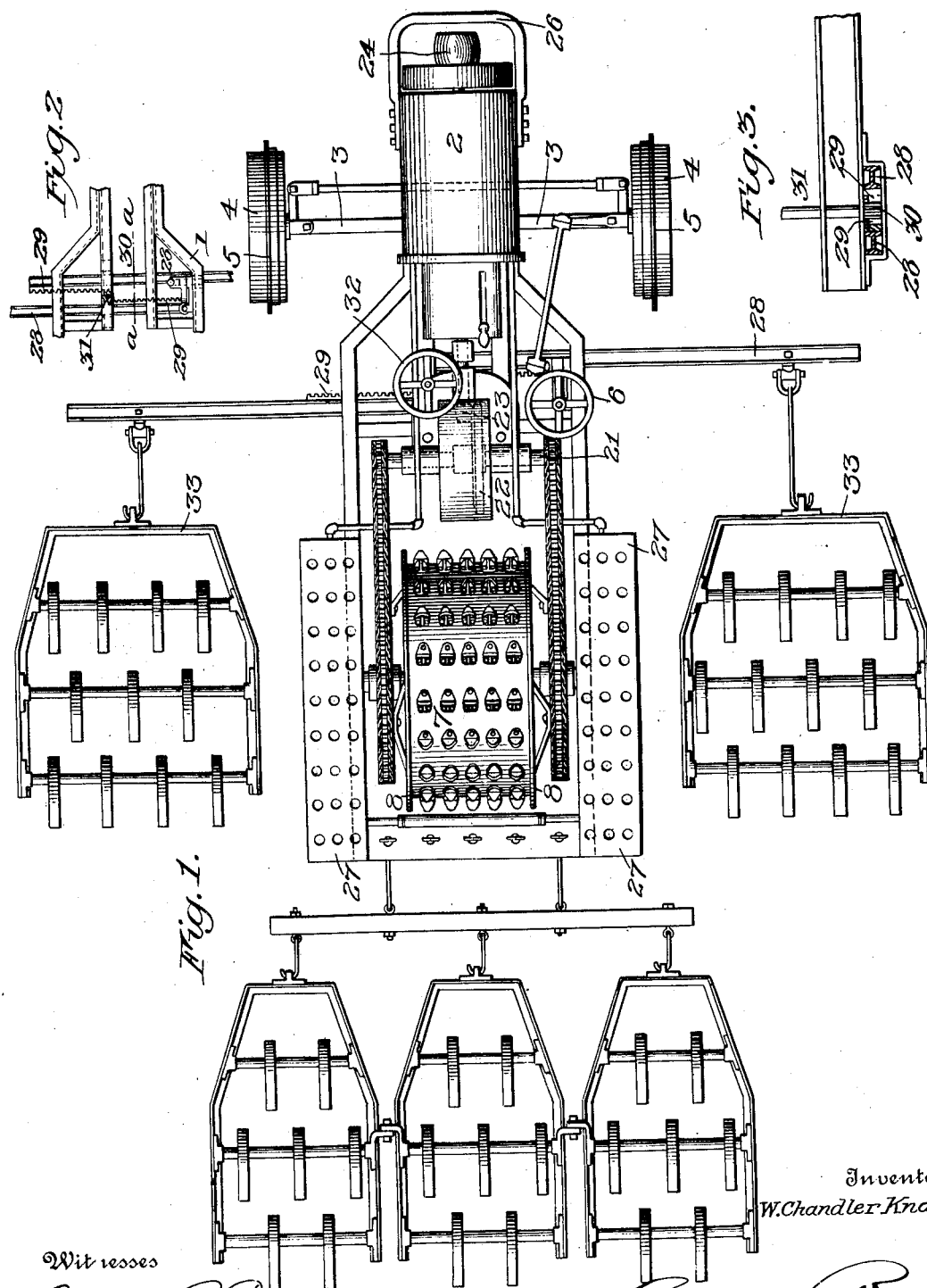

WALTER CHANDLER KNAPP, OF ROCHESTER, NEW YORK.

CULTIVATING-MACHINE.

1,058,370.  Specification of Letters Patent.  Patented Apr. 8, 1913.

Application filed April 8, 1911. Serial No. 619,695.

*To all whom it may concern:*

Be it known that I, WALTER CHANDLER KNAPP, of Rochester, in the county of Monroe and State of New York, have invented certain new and useful Improvements in Cultivating-Machines; and I do hereby declare the following to be a full, clear, and exact description of the same, reference being had to the accompanying drawings, forming a part of the specification, and to the reference-numerals marked thereon.

The present invention relates to cultivating machines, and has for its object to provide an improved structure to be employed in the operation of multiple gangs of cultivators, plows, hoes, and similar farming implements.

To these and other ends the invention consists in certain improvements and combinations of parts, all as will be hereinafter more fully described, the novel features being pointed out in the claims at the end of the specification.

In the drawings: Figure 1 is a top plan view of a machine embodying the features of the present invention. Fig. 2 is a detail view in elevation of the laterally adjustable beams to which the cultivator frames are attached. Fig. 3 is a sectional view on the line *a—a* of Fig. 2.

Similar reference numerals in the several figures indicate similar parts.

The present embodiment of the invention is illustrated as applied to an automobile, or motor vehicle, comprising a main frame 1 at the front of which is supported an engine 2, preferably of the explosive type. A front axle 3 is provided to which are pivoted the steering wheels 4, the latter having outwardly extending flanges 5 thereon and being connected to the steering wheel 6 in the usual manner.

Arranged at the rear of the main frame is the driving or traction wheel, comprising in the present embodiment a comparatively wide tread portion 7 having upwardly projecting flanges 8 at its edges, the latter being preferably formed independently of the body portion of the wheel and secured thereto in any suitable manner. Suitable gripping devices are provided for the tread portion of the wheel between the side flanges 8. It is to be noted that the side flanges 8 secure a stronger gripping action and resulting increased traction power of the wheel by reason of the fact that they engage deeply in the ground, and hold the earth, which the wheel is using in traction from slipping out sidewise away from the thrust of the projections. By thus retaining the earth with which the wheel is engaging in a more or less fixed state, increased resistance is afforded to the projections on the tread surface, and any tendency toward slipping is obviated. The side flanges also serve to hold the machine when working on the side of a hill, and to prevent skidding when subjected to side draft. Further, they protect bridges and floors from the projections on the tread, and allow the machine to be moved about readily on any hard surface.

The engine employed in connection with the present invention, as herein disclosed, is of the explosive type and for the purpose of maintaining the proper temperature of the cooling fluid, there are provided cooling chambers 27 which are preferably mounted at the rear of the main frame on opposite sides of the traction wheel, being connected to the water jacket by suitable connecting pipes. The positioning of the cooling chambers at the rear of the main frame serves to direct greater weight onto the traction wheel, and thus produces a more balanced machine, as well as one capable of great traction power and enormous strain.

For attaching the cultivator, plow, or other implement frames, there are provided a pair of I-beams 28 mounted on the main frame, and arranged for slidable adjustment laterally thereof. To this end, the I-beams have each a rack 29 provided on their adjacent faces, with which coöperates a pinion 30 mounted on the post 31 to which is secured a controlling handle 32 at the upper end. It will be apparent that by turning the operating handle, the I-beams will be caused to move in opposite directions, inwardly or outwardly of the main frame according to the direction of movement of the operating handle. The cultivator frames 33 are attached to the I-beams 28 in any convenient manner, as shown, and are capable of ready movement toward and away from the vehicle. This adjustment of the cultivator frames is of extreme advantage and importance where the implement is used in an orchard, for instance, and it becomes desirable to draw the frames near to the vehicle to avoid contact with a tree or similar obstruction in turning, as well as at other times. A gang of cultivator frames may be attached at the rear of the main frame, as shown, so that in the normal operation of the parts, a very wide expanse of ground may be covered by the machine, while at the same time, the parts may be brought into a comparatively small compass where the field of operation becomes narrowed.

By this construction, there is afforded a cultivating machine or farming implement for similar purposes, which possesses great durability, and while of comparatively simple construction is characterized by a very high traction efficiency and great rigidity of the various parts, at the same time providing a readily operated means for effecting quick adjustment of the cultivating frames.

I claim as my invention:

1. In a cultivating machine, the combination with a traveling support, of a pair of beams slidably mounted on the support and arranged in parallelism at right angles to the length of the machine, said beams extending laterally of the support beyond the sides thereof, means for moving the beams simultaneously in opposite directions, and cultivator frames attached to the beams and normally extending parallel to the length of the machine.

2. In a cultivating machine, the combination with a wheeled frame, of a pair of beams slidably mounted on the frame and arranged in parallelism at right angles to the length of the machine, said beams extending laterally beyond the sides of the frame and the wheels thereof, means for moving the beams simultaneously in opposite directions, and cultivator frames attached to the beams and extending parallel to the length of the machine, said cultivator frames being otherwise unattached to the wheeled frame.

W. CHANDLER KNAPP.

Witnesses:
 H. E. STONEBRAKER,
 HENRY W. HALL.